US008306841B2

(12) United States Patent
Clarke

(10) Patent No.: US 8,306,841 B2
(45) Date of Patent: Nov. 6, 2012

(54) ENTERPRISE PROJECT MANAGEMENT SYSTEM AND METHOD THEREFOR

(75) Inventor: Herman J. Clarke, Scottsdale, AZ (US)

(73) Assignee: 4Sight Technologies, Inc., Scottsdale, AZ (US)

( * ) Notice: Subject to any disclaimer, the term of this patent is extended or adjusted under 35 U.S.C. 154(b) by 2063 days.

(21) Appl. No.: 11/267,698

(22) Filed: Nov. 4, 2005

(65) Prior Publication Data

US 2006/0053043 A1 Mar. 9, 2006

Related U.S. Application Data

(63) Continuation-in-part of application No. 09/837,807, filed on Apr. 17, 2001, now Pat. No. 7,171,375.

(51) Int. Cl.
*G06Q 10/00* (2012.01)

(52) U.S. Cl. ............... 705/7.23; 705/7.16; 705/7.17; 705/301

(58) Field of Classification Search .......... 705/8
See application file for complete search history.

(56) References Cited

U.S. PATENT DOCUMENTS

| | | | |
|---|---|---|---|
| 5,093,794 A | 3/1992 | Howie et al. | |
| 5,099,431 A | 3/1992 | Natarajan | |
| 5,101,352 A | 3/1992 | Rembert | |
| 5,381,332 A * | 1/1995 | Wood | 705/8 |
| 5,432,887 A | 7/1995 | Khaw | |
| 5,737,227 A | 4/1998 | Greenfield et al. | |
| H1743 H | 8/1998 | Graves et al. | |
| 5,881,283 A | 3/1999 | Hondou et al. | |
| 5,907,490 A * | 5/1999 | Oliver | 700/90 |
| 6,119,102 A | 9/2000 | Rush et al. | |
| 6,141,647 A | 10/2000 | Meijer et al. | |
| 6,216,109 B1 | 4/2001 | Zweben et al. | |
| 6,345,259 B1 | 2/2002 | Sandoval | |
| 6,370,521 B1 | 4/2002 | Pigos, Jr. et al. | |
| 6,397,118 B1 | 5/2002 | Gleditsch et al. | |
| 6,415,259 B1 | 7/2002 | Wolfinger et al. | |
| 6,539,399 B1 | 3/2003 | Hazama et al. | |
| 7,124,059 B2 * | 10/2006 | Wetzer et al. | 702/184 |
| 7,225,141 B2 * | 5/2007 | Calderaro et al. | 705/7.14 |
| 7,266,570 B2 * | 9/2007 | Cahill et al. | 707/200 |
| 7,305,392 B1 * | 12/2007 | Abrams et al. | 707/770 |
| 7,324,954 B2 * | 1/2008 | Calderaro et al. | 705/7.28 |
| 7,483,841 B1 * | 1/2009 | Jin et al. | 705/7.11 |
| 7,716,244 B2 * | 5/2010 | Abrams et al. | 707/785 |
| 8,060,394 B2 * | 11/2011 | Woodings et al. | 705/7.13 |

(Continued)

OTHER PUBLICATIONS

Tarek K Abdel-Hamid, Kishore Sengupta, & Clint Swett. (1999). The impact of goals on software project management: An experimental investigation. MIS Quarterly, 23(4), 531-555.*

(Continued)

*Primary Examiner* — Gurkanwaljit Singh
(74) *Attorney, Agent, or Firm* — Quarles & Brady LLP

(57) ABSTRACT

A project management system uses a work breakdown structure to define the project tasks. The work breakdown structure is organized as set of hierarchical related project tasks. The work breakdown structure can be loaded in part from a template. A calendar breakdown structure defines events associated with project resources. The calendar breakdown structure is defined on departmental basis. A resource breakdown structure defines available resources. The resource breakdown structure includes personnel and tools. The allocation of available resources to the project tasks is optimized within the constraints of the work breakdown structure and calendar breakdown structure. A histogram of project demand versus available resources is generated. The histogram of project demand versus available resources is used to optimize resource allocation.

19 Claims, 10 Drawing Sheets

U.S. PATENT DOCUMENTS

| | | | |
|---|---|---|---|
| 2001/0056362 A1 | 12/2001 | Hanagan et al. | |
| 2002/0055870 A1* | 5/2002 | Thomas | 705/10 |
| 2002/0077877 A1* | 6/2002 | Oliver | 705/8 |
| 2002/0082889 A1* | 6/2002 | Oliver | 705/8 |
| 2003/0004736 A1* | 1/2003 | Calderaro et al. | 705/1 |
| 2003/0004783 A1* | 1/2003 | Calderaro et al. | 705/10 |
| 2003/0004789 A1* | 1/2003 | Calderaro et al. | 705/11 |
| 2003/0101091 A1* | 5/2003 | Levin et al. | 705/11 |
| 2004/0002887 A1* | 1/2004 | Fliess et al. | 705/9 |
| 2004/0068419 A1* | 4/2004 | Salwitz et al. | 705/1 |
| 2004/0068427 A1* | 4/2004 | Su | 705/9 |
| 2004/0162748 A1* | 8/2004 | Vogel et al. | 705/8 |
| 2004/0162753 A1* | 8/2004 | Vogel et al. | 705/10 |
| 2004/0254764 A1* | 12/2004 | Wetzer et al. | 702/184 |
| 2004/0267595 A1* | 12/2004 | Woodings et al. | 705/9 |
| 2005/0004825 A1* | 1/2005 | Ehrler et al. | 705/8 |
| 2005/0027386 A1* | 2/2005 | Weigand et al. | 700/97 |
| 2005/0171790 A1* | 8/2005 | Blackmon | 705/1 |
| 2005/0222899 A1* | 10/2005 | Varadarajan et al. | 705/11 |
| 2006/0293982 A1* | 12/2006 | Hicks et al. | 705/35 |
| 2007/0067196 A1* | 3/2007 | Usui | 705/8 |
| 2007/0129976 A1* | 6/2007 | Hochberg et al. | 705/7 |
| 2007/0150327 A1* | 6/2007 | Dromgold | 705/8 |

OTHER PUBLICATIONS

Nesi, P.. (1998). Managing OO projects better. IEEE Software, 15(4), 50-60.*

Carbno, Collin. "Optimal Resource Allocation for Projects." Project Management Journal 30.2 (1999): 22. Business Source Complete.*

Phillips, Patricia G. (2004). A framework for staffing e-commerce projects in a dynamic business environment. D.Sc. dissertation, Robert Morris University, United States—Pennsylvania.*

L Douglas Smith, Robert M Nauss, Ashok Subramanian, & Ron Beck. (2004). Decision Support for Staffing, Outsourcing and Project Scheduling in MIS Strategic Plans. Infor, 42(1), 79-100.*

Vacca, John R., Feb. 1992, "Recapturing the Industrial Market (Software Tools are available to enable US manufacturers to recapture markets worldwide)", Midrange Systems, v5, n3, p. 52(3).

* cited by examiner

FIG. 4

| TASK OBJECTS | | | | | | | |
|---|---|---|---|---|---|---|---|
| COST CENTER | ACCOUNT NO. | JOB ID | DESCRIPTION | TYPE | WORK DURATION | PLAN START | PRIORITY |
| | | | MODULE 1 | | | | |
| | | | PRE-PRODUCTION | TASK | | | |
| | | | PRODUCTION | TASK | | | |
| | | | POST-PRODUCTION | TASK | | | |

FIG. 5

| TASK OBJECTS | | | | | | | |
|---|---|---|---|---|---|---|---|
| COST CENTER | ACCOUNT NO. | JOB ID | DESCRIPTION | TYPE | WORK DURATION | PLAN START | PRIORITY |
| | | | PREPARE REQUIREMENTS | TASK | | | |
| | | | REVIEW REQUIREMENTS | TASK | | | |
| | | | COLLECT SIGNATURES | TASK | | | |
| | | | PROJECT KICK OFF | MILESTONE | | | |

FIG. 9

| RESOURCE CATEGORIES 132 | | NAME 134 | FUNCTION 138 | QTY 140 | TYPE 142 | CALENDAR 144 |
|---|---|---|---|---|---|---|
| COST CENTER | ACCOUNT NO. 136 | | | | | |
| | | PROJECT MANAGERS | | | | |
| | | SOFTWARE ENGINEERS | | | | |
| | | TEST ENGINEERS | | | | |
| | | QUALITY ASSURANCE | | | | |

| PERSONNEL 152 | | RESOURCE TYPE 156 | ID # 158 | DESCRIPTION 160 | SKILL NO. 162 |
|---|---|---|---|---|---|
| COST CENTER | ACCOUNT NO. 154 | | | | |
| | | SOFTWARE ENGINEERS | | JOHN | |
| | | SOFTWARE ENGINEERS | | BRIAN | |
| | | SOFTWARE ENGINEERS | | JULIE | |
| | | SOFTWARE ENGINEERS | | GEORGE | |

150

ENTERPRISE PROJECT MANAGEMENT SYSTEM AND METHOD THEREFOR

CLAIM TO DOMESTIC PRIORITY

The present application is a continuation-in-part of U.S. patent application Ser. No. 09/837,807 entitled "Method and System for Enterprise Wide Production Scheduling", filed on Apr. 17, 2001, now U.S. Pat. No. 7,171,375 by Hernan J. Clarke. The present application claims priority to subject matter disclosed in the prior U.S. patent application Ser. No. 09/837,807.

FIELD OF THE INVENTION

The present invention relates in general to project management tools and, more particularly, to an enterprise project management system having multiple structural modules for assigning and tracking work progress.

BACKGROUND OF THE INVENTION

Most, if not all, workplace environments operate with the need to perform many logistical tasks necessary to achieve short term and long term production, maintenance, and scheduling goals. Such workplace environments include factories, research and development centers, government agencies, educational institutions, government contractors, financial institutions, retail operators, and many other complex and operationally intensive businesses. One example is the aerospace industry which is involved in the design, development, manufacture, and support of military and commercial aviation and aeronautics.

In the aerospace industry, the design and manufacture of military and commercial aircraft and avionic systems involves many integral and interrelated steps, systems, subsystems, teams of skilled workers, subcontractors, task management, maintenance, scheduling, budgeting, compliance, problem resolution, and general coordination of efforts to achieve the successful completion of compliant deliverables on-time and within budget.

The typical approach to project management involves breaking down the overall project into a series of tasks and subtasks, some of which are performed serially and some in parallel. The project manager and his/her team assigns the available resources to perform the tasks. Project management requires skills and experience in understanding scope of work, setting realistic assumptions and estimations, use of resources, risk management, critical path analysis, conflict resolution, compliance, quality control, integration of specifications, and effective leadership to be successful.

Most projects are carefully planned and conscientiously executed. Yet, it is a fundamental reality that no project of any significance goes entirely as planned. The project management team makes use of resources such as flow charts, Gantt charts, project schedules, presentations, and other computer tools to plan, schedule, track progress, identify problem areas, take corrective action, generate status reports, and make strategic adjustments to the project plan as necessary over the project lifecycle to efficiently and effectively manage the project.

The challenge is to convert the project plan and schedule into specific interrelated engineering, production, and maintenance tasks, and then assign the appropriate resources to complete those tasks. Resource allocation, timing, assessment, and adaptability are critical. Yet, historically, project managers have still had difficulty in accurately projecting the resources and time that the overall job or even certain tasks may require. In some cases, the available resources are underutilized, resulting in project inefficiencies. In other cases, the resources are over-committed, resulting in delayed schedules. Prior project management tools do not necessarily bring all aspects of the project into an optimized resource allocation solution.

SUMMARY OF THE INVENTION

In one embodiment, the present invention is a computer implemented method of project management comprising providing a work breakdown structure of dependencies between project tasks, providing a resource breakdown structure of available resources, providing a calendar breakdown structure of availability of the resources, optimizing allocation of the resources to the project tasks within constraints of the resources in accordance with the work breakdown structure and calendar breakdown structure, and scheduling the resources to complete the project tasks.

In another embodiment, the present invention is a method of managing project execution, comprising generating a set of hierarchical related task objects, generating a plurality of calendars for project resources, identifying a set of resources for performing the task objects, allocating the set of resources to perform the task objects, and optimizing the resource allocation to the task objects.

In another embodiment, the present invention is a computer system, comprising means for providing a work breakdown structure of dependencies between project tasks, means for providing a resource breakdown structure of available resources, means for providing a calendar breakdown structure of availability of the resources, means for optimizing allocation of the resources to the project tasks within constraints of the resources in accordance with the work breakdown structure and calendar breakdown structure, and means for scheduling the resources to complete the project tasks.

In another embodiment, the present invention is a computer program product comprising computer readable program code which provides a work breakdown structure of dependencies between project tasks, provides a resource breakdown structure of available resources, provides a calendar breakdown structure of availability of the resources, optimizes allocation of the resources to the project tasks within constraints of the resources in accordance with the work breakdown structure and calendar breakdown structure, and schedules the resources to complete the project tasks.

BRIEF DESCRIPTION OF THE DRAWINGS

FIG. 4 is a data entry screen for entering task objects associated with the project;

FIG. 5 is a data entry screen for entering sub tasks associated with a given task object;

FIG. 9 is a data entry screen for resource categories;

FIG. 10 is a data entry screen for personnel within a resource category;

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

The project management system described herein provides a process and structure for coordinating completion of substantially any complex or multifaceted project. The project may apply to areas such as manufacturing, transportation, logistics, financial services, utilities, energy, telecommunications, government, aviation, defense, and retail. Complex projects are typically constrained by time and resources and often have dependencies between tasks and subtasks within the project. The constrained resources must be applied at the right time and in the right order to minimize duration to completion and achieve budgetary targets of the project. The proper utilization of the limited resources to constrained tasks is fundamental to optimization of the project schedule.

Figure 1:
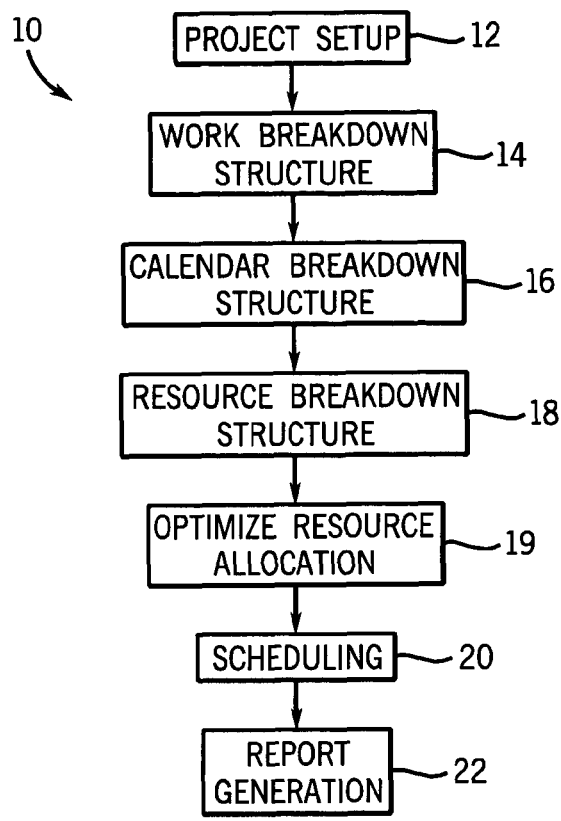
FIG. 1 illustrates a project management flowchart.

Referring to FIG. 1, program management system 10 is shown having multiple components or modules. Project setup module 12 provides for entering or loading the data and information related to the project in general. Work breakdown structure (WBS) module 14 provides for entering or loading the data and information related to the tasks that need to be performed in a logical and hierarchically organized structure. The work breakdown structure records all modules, phases, tasks, and subtasks related to the project and presents the totality of project action items in an easy to read graphical format. Calendar breakdown structure (CBS) module 16 allows the user to define important days and times for work schedules, holidays, vacation, etc. of resources on a department by department basis. Resource breakdown structure (RBS) module 18 assigns resources to the task objects, within the constraints of the project calendars. Optimization resource allocation module 19 organizes resources to tasks for optimal utilization. Scheduling module 20 uses the optimization resource allocation module 19 to bring the WBS, CBS, and RBS modules together to schedule the execution of the project based on available resources to accomplish the defined tasks within the constraints of the project calendar. Report generation module 22 displays a variety of reports for project management and other project personnel, as well as graphs for optimizing resource allocation.

In one embodiment, the above system and process can be implemented as one or more software applications or computer programs residing and operating on a computer system. The computer system may be a stand-alone unit or part of a distributed computer network. The computer is typically electronically interconnected with other computers using communication links such as Ethernet, radio frequency (RF), satellite, telephone lines, optical, digital subscriber line, cable connection, wireless, and other recognized communication standards. The electronic connection link between computers can be made through an open architecture system such as the World Wide Web, commonly known as the Internet. The Internet offers a significant capability to share information, data, and software.

Figure 2:
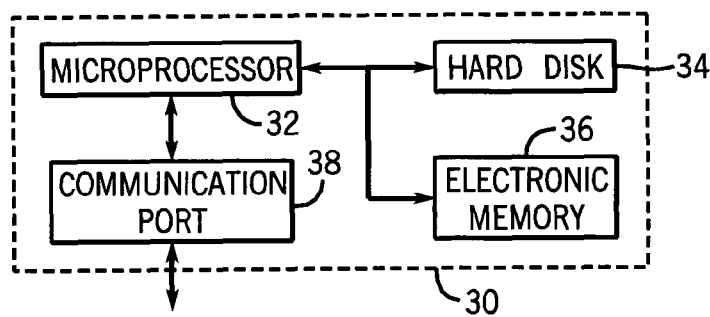
FIG. 2 illustrates a computer system for executing the project management method.

FIG. 2 illustrates a simplified computer system 30 for executing the software program used in the enterprise wide project management system. Computer system 30 is a general purpose computer including a central processing unit or microprocessor 32, mass storage device or hard disk 34, electronic memory 36, and communication port 38. Communication port 38 represents a modem, high-speed Ethernet link, or other electronic connection to transmit and receive input/output (I/O) data with respect to other computer systems.

Figure 3:
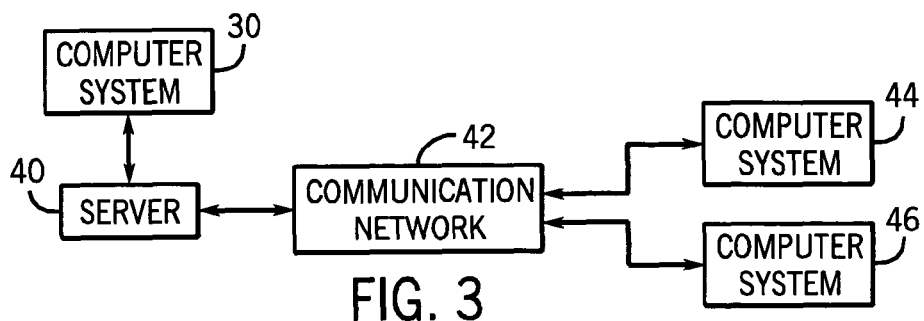
FIG. 3 illustrates a computer communication network.

In FIG. 3, computer 30 is shown connected to server 40 by way of communication port 38, which in turn is connected to communication network 42. Server 40 operates as a system controller and includes mass storage devices, operating system, and communication links for interfacing with communication network 42. Communication network 42 can be a local and secure communication network such as an Ethernet network, global secure network, or open architecture such as the Internet. Computer systems 44 and 46 can be configured as shown for computer 30 or dedicated and secure data terminals. Computers 44 and 46 are also connected to communication network 42. Computers 30, 44, and 46 transmit and receive information and data over communication network 42.

When used as a stand alone unit, computer 30 can be located in any convenient location. When used as part of a computer network, computers 30, 44, and 46 can be physically located in any location with access to a modem or communication link to network 42. For example, computer 30 can be located in the project manager's main office. Computer 44 can be located in the engineering department office. Computer 46 can be located on the production floor. Alternatively, the computers can be mobile and follow the users to any convenient location, e.g., remote offices, customer locations, hotel rooms, residences, vehicles, public places, or other locale with electronic access to communication network 42.

Each of the computers runs application software and computer programs, which can be used to display user interface screens, execute the functionality, and provide the features as described hereinafter. In one embodiment, the screens and functionality are provided on one or more websites or portals on the Internet. The websites are generally restricted access and require passwords or other authorization for accessibility. Communications through the website may be encrypted using secure encryption algorithms. Alternatively, the following screens are accessible only on the secure private network, such as Virtual Private Network (VPN), with proper authorization.

The software is originally provided on computer readable media, such as compact disks (CDs), magnetic tape, or other mass storage medium. Alternatively, the software is downloaded from electronic links such as the host or vendor website. The software is installed onto the computer system hard drive 34 and/or electronic memory 36, and is accessed and controlled by the computer's operating system. Software updates are also electronically available on mass storage medium or downloadable from the host or vendor website. The software, as provided on the computer readable media or downloaded from electronic links, represents a computer program product usable with a programmable computer processor having a computer readable program code embodied therein. The software contains one or more programming modules, subroutines, computer links, and compilation of executable code which performs the functionality of the project management process. The user interacts with the software via keyboard, mouse, voice recognition, and other user interface devices to the computer system.

The software stores information and data generated during the project management process in a database or file structure located on any one of, or combination of, hard drives 34 of the computers 30, 44, 46, and/or server 40. More generally, the information generated during the project management process can be stored on any mass storage device accessible to the computers 30, 44, 46, and/or server 40. The mass storage device for storing the project management information may be part of a distributed computer system.

In the case of Internet-based websites, the interface screens are implemented as one or more webpages for receiving, viewing, and transmitting information related to the project management process. A host service provider may set up and administer the website from computer 30 or server 40 located in the host service provider's home office. The local project manager accesses the webpages from computer 44 via communication network 42. Alternatively, the screens can be setup for other departments supporting the project on computer 46.

For the purpose of the following illustration, the webpages for displaying the interface screens and exchange of information is provided on server 40. FIGS. 4-15 illustrate a few of the types of selections and information that can be made available on the program management website or other software user interface. An actual commercial website or software user interface will include more in the way of graphics, drawings, text, instructions, marketing, color, and appeal. The hierarchical structure of the program management website or software user interface is organized by design choice. The organization and design of the website or user interface can take many forms and hierarchical structures. Some website designs pack as much information and as many hyperlinks as possible into the first webpage. Other website designs have a first webpage that is clean and simple and count on the user providing some preliminary information before moving to lower level webpages.

The screens or webpages described herein utilize a common user interface, such as may be found in a Windows environment, including title bar, selectable function bar (File, Edit, View, Insert, Format, Tools, Report, Help) with icons, pull down selections and options, tool bars, and main body. The main body displays project related information for the user.

The following discussion involves a simplified project definition and execution of project management system 10 for ease of explanation and understanding. It is understood that project management system 10 can be used for more complex and multifaceted projects.

Data entry screen or webpage 60 shown in FIG. 4 supports project setup module 12 and provides for entering or loading the information related to the project in general. The user enters project name, client, start date, completion date, milestones, deliverables, and other basic project information. In the present example, the project is a software automation project.

To further define the project, the user enters information for one or more task objects to create a work breakdown structure to show demand and expectations. In the work breakdown structure module 14, the user defines and plans the project from the top to the bottom (top down). Each task object has a cost center 62, account number 64, job ID 66, description 68, type 70, work duration 72, start time 74, and priority 76. The user enters the information for one or more task object fields relevant for the project at hand. In FIG. 4, the major task objects are given as module 1, pre-production, production, and post-production.

Each task object can be made hierarchical, including multiple levels of task modules and subtasks within a given task module. Note that FIG. 4 does not necessarily distinguish between hierarchy of task objects. To simplify the data entry process, the task objects can be entered at the same level. Each type is given a simple task. A task object hierarchy can be created in later screens. Alternatively, the task object hierarchy can be defined at the time of data entry. In the present case, pre-production, production, and post-production task objects will be made subordinate to module 1.

Data entry screen or webpage 78 in FIG. 5 shows additional task objects entered into project management system 10. The additional task objects are given as prepare requirements, review requirements, collect signatures, and project kick-off. The user defines the project kick-off as a reportable milestone. The additional tasks can be entered as undefined in terms of the project hierarchy or, as in this case, as subtasks of a given task object, e.g., the pre-production task object.

For each data entry screen disclosed herein, not all fields are assigned values for simplicity of explanation. In practice, most, if not all, fields will be given values.

Figure 6:
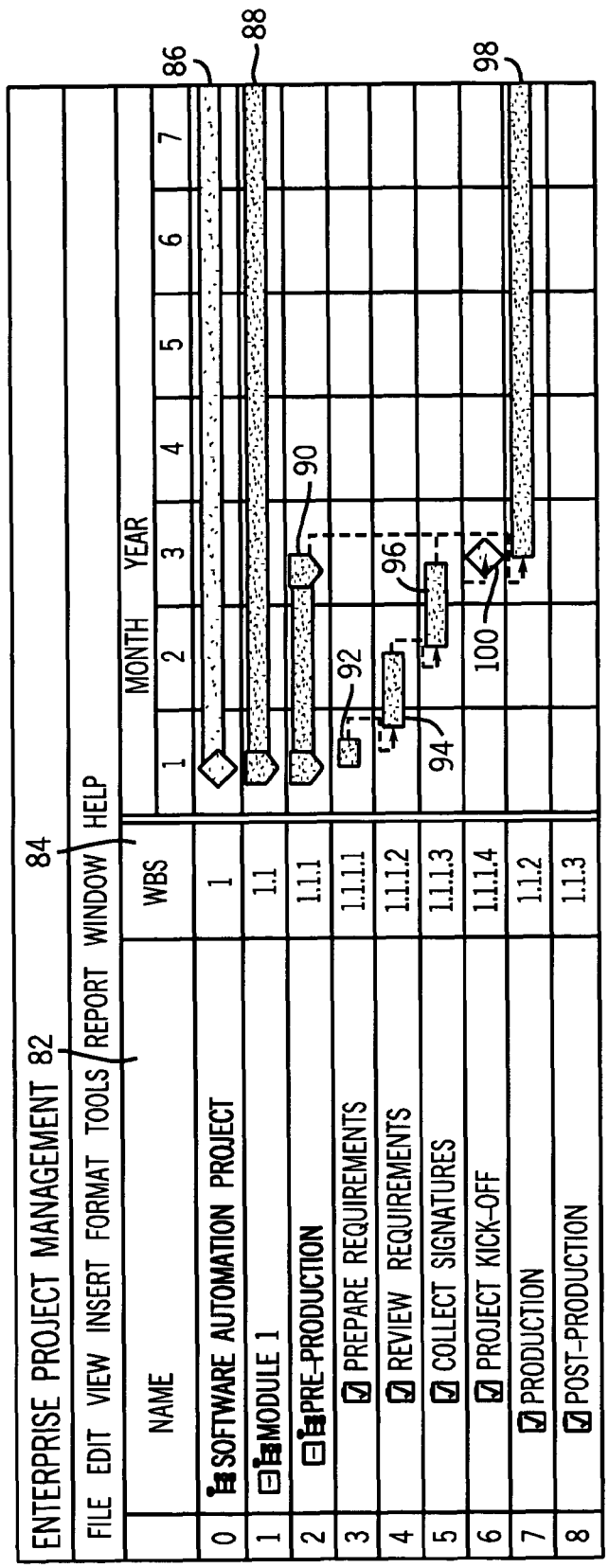
FIG. 6 illustrates the hierarchical task objects with time lines and dependencies.

FIG. 6 illustrates the simplified project task objects for the software automation project after having been defined into its relative task object hierarchy. The work breakdown structure (WBS) is shown in data entry screen or webpage 80. In column 82, under the software automation project, there exists one or more project modules. Module 1 involves pre-production, production, and post-production task objects. Pre-production involves prepare requirements, review requirements, collect signatures, and project kick-off sub task objects.

The hierarchy of the work breakdown structure is shown in WBS column 84. Module 1 is defined as WBS 1.1; pre-production is defined as WBS 1.1.1; prepare requirements is defined as WBS 1.1.1.1; review requirements is defined as WBS 1.1.1.2; collect signatures is defined as WBS 1.1.1.3; project kick-off is defined as WBS 1.1.1.4; production is defined as WBS 1.1.2; and post-production is defined as WBS 1.1.3. Accordingly, module 1 is subordinate to the software automation project; pre-production, production, and post-production are subordinate to module 1; and prepare requirements, review requirements, collect signatures, and project kick-off are subordinate to pre-production.

It is understood that most, if not all, project task definitions can be organized into a similar work breakdown structure. Each phase of the project can be broken down into logical tasks and subtasks with a pre-defined hierarchical structure. The work breakdown structure can be defined for large and small projects in software development, hardware development, maintenance, research and development, and the like.

Project management system 10 allows the user to enter each and every task object. For convenience and efficiency, project management system 10 also maintains a database on hard disk 34 of task object templates that can be used to enter reusable or boilerplate task objects. For example, if the task objects associated with the pre-production phase are common and routine, then the user can select and load one or more task object templates into the work breakdown structure with just a few clicks or keystrokes. The same template loading feature is available for common and routine task objects used in the production phase and postproduction phase of module 1. A template or package of task objects can be loaded under any module, phase, or subtask of the work breakdown structure.

Many times, depending on the project, one task module will have the same or substantially similar structure as other task modules. Once module 1 is defined, either by user provided information or by selection of task object templates, the work breakdown structure from module 1, or any portion thereof, can be copied to module 2. Any differences from one module to another module can be handled by editing the copied module.

Accordingly, project management system 10 makes it easy to build and change the work breakdown structure and hierarchical relationships between the task objects. Task objects can be copied, edited, and changed as to their hierarchical work breakdown structure with a simple and convenient user interface such as pointing and clicking with a mouse. The user interface can be provided with icons, pull down menus, and personal preferences. The task objects can also be imported from other applications.

The user can also establish dependency chains between related task objects. For example, a dependency chain may require that one task object be started before another one can start, or that one task object be completed before another one can begin, or that certain task objects start or end simultaneously, or that one task object cannot end until another one begins, or that one task object starts some period of time after another one starts or finishes, or that one task object starts after some event, and so on.

Based on plan start and work duration of the task objects, as well as dependency chains, the work breakdown structure can be scheduled as shown in FIG. 6. Time bar 86 shows the time line for the software automation project; time bar 88 shows the time line for module 1; time bar 90 shows the time line for the pre-production task object; time bar 92 shows the time line for the prepare requirements task object; time bar 94 shows the time line for the review requirements task object; time bar 96 shows the time line for the collect signatures task object; time bar 98 shows the time line for the production task object. The scheduling can be determined on a constrained or unconstrained basis of available resources. Notice that the task object for review requirements is dependent on the completion of the task object for prepare requirements, the task object for collect signatures is dependent on the completion of the task object for review requirements, and the task object for production is dependent on completion of the task object for pre-production. Milestone 100 indicates the end of pre-production and time for project kick-off.

While only a portion of the software automation project is shown in FIG. 6, it is understood that additional task objects for the complete project can be included using the same hierarchical work breakdown structure described above.

Project management system 10 uses calendar breakdown structure module 16 as the master calendar for resources, events, target dates, time lines, and coordination of resources to activities. Calendar breakdown structure 16 has a resource calendar, task calendar, project calendar, and corporate calendar. Project management system 10 uses the calendar breakdown structure algorithms to handle multiple embedded calendars through the defined work breakdown structure. The following discussion demonstrates how the work breakdown structure makes use of the resource calendar, task calendar, project calendar, and corporate calendar in the timeline definition.

Project management system 10 uses a number of different calendars for planning and scheduling the software automation project. For example, the corporate calendar is configurable and allows the user to set normal work days, fixed holidays, floating holidays, vacation time, sick days, etc. The corporate calendar defines daily start time, end time, multiple work shifts, and breaks. The calendar can be customized for each day of the week and for each department, e.g., production and quality assurance may have a different calendar than engineering or maintenance. Other calendars can be defined for each department and work shift involved in the project for planning their activities. Project management system 10 may have a project calendar, task calendar, resource calendar, department calendars, etc. There may be a different calendar for the engineering department, production shift, maintenance department, corporate, etc.

Figure 7:
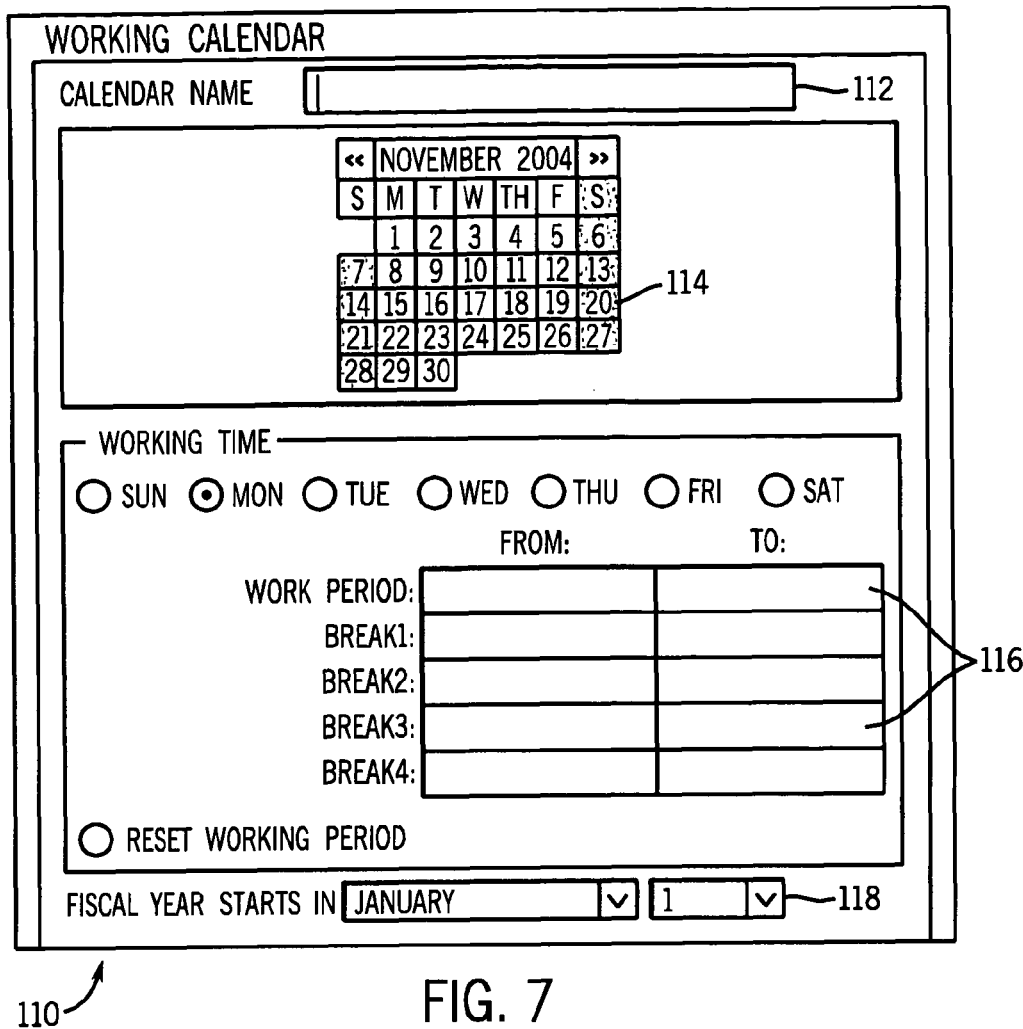
FIG. 7 is a data entry screen for a project calendar.
Figure 8:
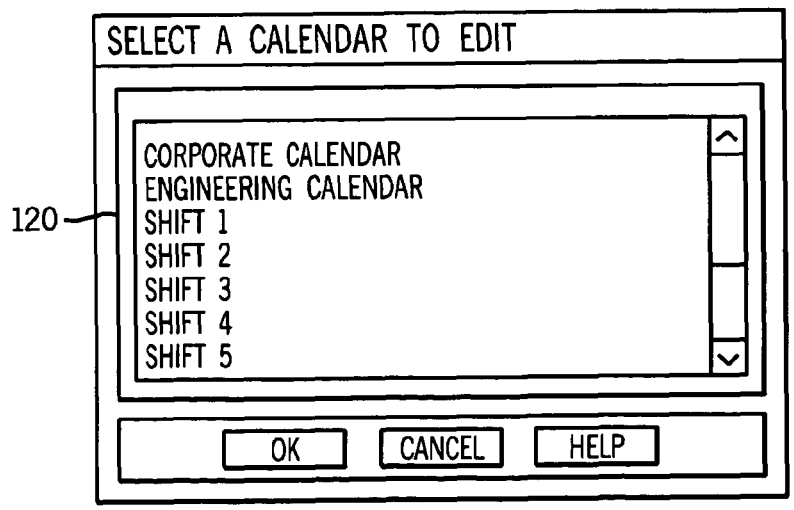
FIG. 8 illustrates selecting a predefined calendar for copying and editing.

Data entry screen or webpage 110 is shown in FIG. 7 to support the calendar breakdown structure 16. A calendar name is defined in block 112. The user can select the relevant date(s) from rotating calendar 114. The user can enter the requisite times for work periods and breaks for each day of the week in blocks 116. The corporate calendar also sets a fiscal reporting month and day in block 118. Once a calendar is defined, it can be selected, copied, and edited from window 120 in FIG. 8 as changes need to be made.

Once the project calendars are created, the constraints defined in the respective calendars are applied to the work breakdown structure for each work day and for each shift and department. In most work environments, the work breakdown structure alone is insufficient to accurately predict start times and completion times of the task objects. Not all physical work times and work days can be properly or productively applied to the task objects. For example, the task object time lines of FIG. 6 must take into account holidays, vacations, and work shifts, on a department by department basis. The calendar breakdown structure, in combination with the work breakdown structure, creates realistic time lines for allocation of resources within the constraints imposed by the project calendars.

Figure 12:
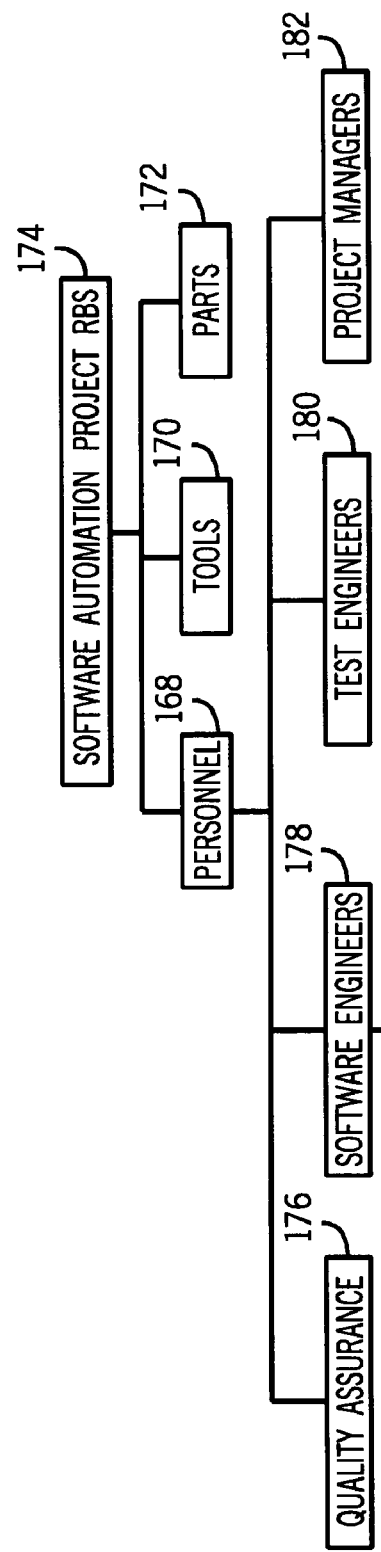
FIG. 12 is a graphical representation of the resource hierarchy.
Figure 13:
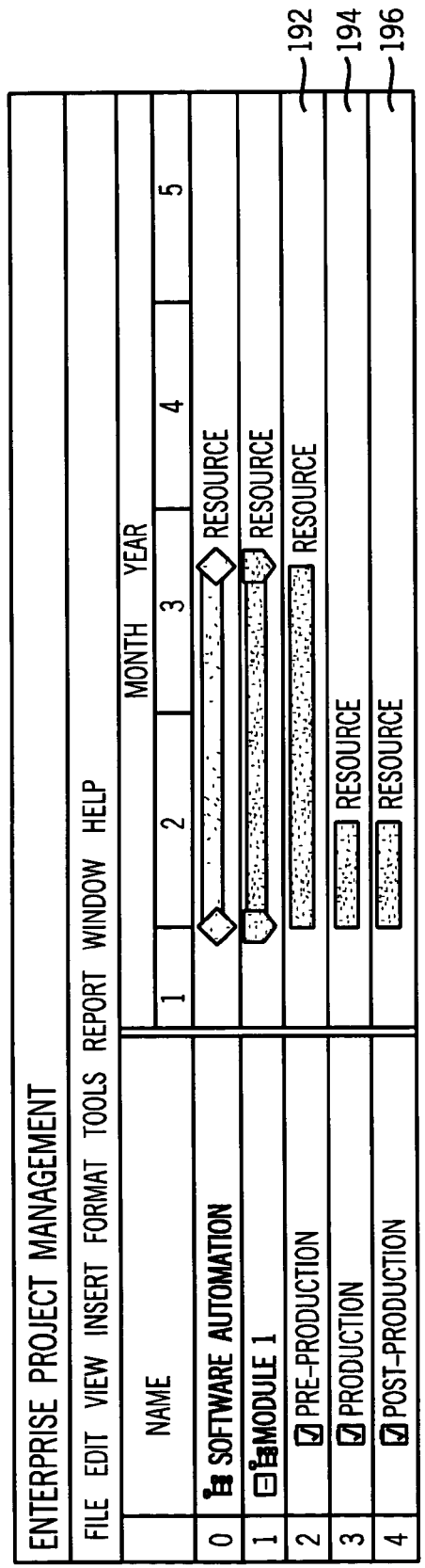
FIG. 13 illustrates the hierarchical task objects with time lines and resource allocation.

Project management system 10 uses resource breakdown structure (RBS) module 18 to assign personnel and equipment resources to the task objects, within the projects calendars. Data entry screen or webpage 130 shown in FIG. 9 supports resource breakdown structure module 18 and provides for entering or loading the information related to work capacity, personnel, equipment, parts, and tools. The resource breakdown structure creates a resource tree as shown in FIG. 12 and can be used to provide more information on the time lines as shown in FIG. 13.

The user enters information for one or more resource categories to create a resource breakdown structure to show the resources available to perform the task objects. Each resource category has a cost center 132, account number 134, name 136, function 138, quantity 140, type 142, and calendar 144. The user enters the information for one or more resource category fields relevant for the project at hand. In FIG. 9, the major resource categories are given project managers, software engineers, test engineers, and quality assurance.

Additional data entry screen or webpages are used to enter personnel, equipment, parts, and tools under each major resource category. For example, data entry screen or webpage 150 in FIG. 10 is used to enter personnel under the software engineer resource category. Each person has a cost center 152, account number 154, resource type 156, ID 158, description 160, and skill number 162. In this case, the software engineers are John, Brian, Julie, and George. The same concept can be used for non-human or inanimate resources, such as equipment, tools, computer time, etc. Again, for each data entry screen disclosed herein, not all fields are assigned values for simplicity of explanation. In practice, most if not all fields will be given values.

Project management system 10 allows the user to enter each and every resource. For convenience and efficiency, project management system 10 also maintains a database of resource templates that can be used to enter reusable or boilerplate resources. For example, if the person associated with software engineering are known and routine, then the user can select and load one or more resources templates into the resource breakdown structure with just a few clicks or keystrokes.

Figure 11:
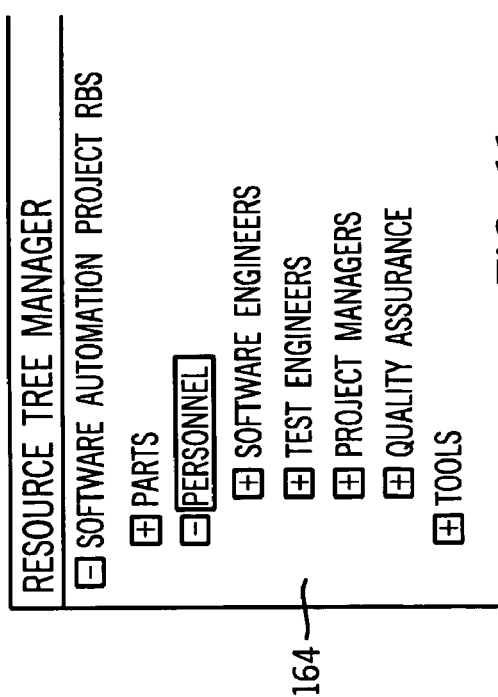
FIG. 11 illustrates the resource tree manager for selecting a predefined resource category.

FIGS. 9 and 10 are used to create categories of resources in order to define people, skill sets, experience levels, cost, and availability. FIG. 11 illustrates resource tree manager 164 used to organize and manage the categories of resources. Resource tree manager 164 organizes the resource categories in a hierarchal format for easy viewing and selection to apply the resources to task objects within the work breakdown structure. FIG. 11 illustrates resource categories for parts, personnel, and tools within the software automation project RBS. Software engineers, test engineers, project managers, and quality assurance are defined subordinate to the personnel resource category.

A graphical view of the resource breakdown structure is shown in FIG. 12. Personnel block 168, tools block 170, and parts block 172 is defined under software automation project RBS 174. Quality assurance block 176, software engineers block 178, test engineers block 180, and project managers block 182 are defined under personnel block 168. Software engineers John, Julie, Brian, and George are shown under the software engineers block 178.

With the resource breakdown structure defined, then, in combination with the work breakdown structure and the calendar breakdown structure, the project management system 10 can assign resources to task objects, within the project calendars, and schedule the execution of the project. The scheduling module 20 brings together the work breakdown structure, calendar breakdown structure, and resource breakdown structure to schedule execution of the project.

Turning to data entry screen or webpage 190 as shown in FIG. 13, the user can highlight a task object and then go to the resource tree manager 164 in FIG. 11 to match up resources to task objects, within the constraints of the project calendar. The scheduling module 20 uses a variety of methods to allocate resources to task object. For example, the scheduling module 20 may use the percent available method to assign resources to task object. In the percent available method, the resources, e.g., software engineers, are assumed to be available some percentage of the time according to their calendar. The software engineers may be assumed to be available 100% of the time stated in their calendar. In other projects, the software engineers may be assumed to be available 50% of the time as stated in their calendar.

Another technique is the earned value method, which correlates the documented productive, efficiency, effectiveness, and skill level of the resource to the task object. The senior software engineer is assumed to have higher productivity than a junior person. A new high speed tool is assumed to get the job done quicker than an older model.

FIG. 13 shows the resources assigned to each task object. Resource 192 is assigned to the pre-production task object; resource 194 is assigned to the production task object; and resource 196 is assigned to the post-production task object. While only a portion of the software automation project is shown in FIG. 13, it is understood that additional task objects and resource assignments would be needed for the complete project.

Project management system 10 uses report module 22 to run reports and optimize the project execution. The report module 22 can display a variety of reports such as histograms, time lines, bar charts, and tabular data. Webpage 200 illustrates one example as histogram 202 from a first utilization scenario of a resource. The histogram 202 is useful to run project simulations and multi-level what-if scenarios of resources which are constrained and unconstrained based on capacity and time to optimize project utilization. The resources can be personnel, parts, equipment, tools, etc. The user can adjust resource allocation, on an individual resource and time utilization basis, to any number of scenarios to see how the project efficiency changes. Report module 22 can also provide forecasting of what might happen based on resource constraints such as tools or manpower.

Figure 14:
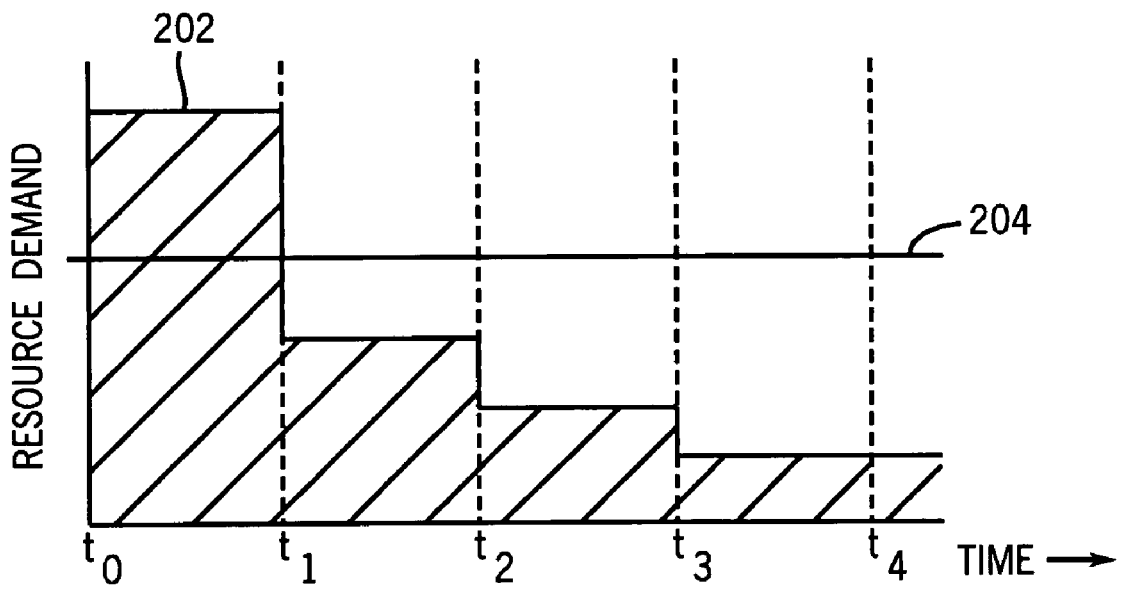
FIG. 14 is a histogram with non-optimized resource allocation.

Line 204 represents an available resource. As seen by histogram 202, between times $t_0$ and $t_1$, the demand on the resource exceeds the available resource. Between times $t_1$ and $t_2$, the resource demand is less than the available resource. Likewise, between times $t_2$ and $t_3$, and between times $t_3$ and $t_4$, the resource demand is less than the available resource, just at different levels. The histogram 202 in FIG. 14 is not considered to be optimized.

One of the features of project management system 10 is the ability to optimize utilization of the available resources to the task at hand, given the constraints of the resources and dependencies amongst the tasks. The optimization process balances demand and availability of resources for maximum operational efficiency. The optimization process begins by identifying the list of tasks that need to be performed for the project as a whole, or at least a portion of the project. A project may have J tasks given by $T=\{1, 2, \ldots, J\}$. The list of tasks and subtasks T represent the logical steps that must be performed to finish the job. The list of tasks are sorted in descending constrained priority, i.e., the highest or most constrained task is listed first, followed by the second most constrained, and third most constrained, and so on. The constraints placed on tasks comes from a variety of origins. Some of the tasks have dependencies which are constrained by predecessor activities, e.g., task T2 cannot begin until task T1 has been completed, or task T2 cannot begin until task T1 has started, or task T1 and task T2 must start simultaneously. Alternatively, the dependencies may be driven by successor activities, e.g., the end of the project being known, drives rest of tasks backwards. Tasks can also be constrained by its demand on resources and the capacity and availability of such resources.

Next, the resources are identified as necessary to complete each task. Resources can be items such as personnel, capital, equipment, tools, vehicles, and facilities. Each resource has a finite capacity and availability, which may be fixed over time, or may vary as a function of time. Some tasks use more than one unit of a resource. Task T1 may require one unit of a resource each unit time period, while task T2 requires two units of the same resource each unit time period. The demand of each task for a given resource can also vary over time.

In a simplified example, assume that task T1 requires resources R1, task T2 requires resources R1 and R2, and task T3 requires resources R2. Resource R1 has capacity to handle only one task at any given time; resource R2 has sufficient capacity to handle two tasks at any given time. A matrix for resource R1 is built to reflect allocation of its capacity over time as it is assigned to pending tasks. For the given resource, the matrix has tasks in columns over each unit time which runs across the rows. Resource R1 can be assigned to task T1 in one time slot, but must be assigned to task T2 in an adjacent or different time slot since there is only one unit of capacity for R1. Likewise, a matrix for resource R2 is built to reflect allocation of its capacity over time as it is assigned to pending tasks. Resource R2 can be assigned to task T2 and task T3 in the same time slot since there are two units of capacity for R2. Within each matrix for each resource, the tasks are sorted in descending order of priority, taking into account work breakdown structure, calendar breakdown structure, priorities, dependencies, and other time constraints. Any task that cannot be completed, given the allocation of constrained resources, is shifted to the next time slot in the matrix.

The matrices of each resource are then merged to create a composite matrix of resources for all tasks within the project or portion of the project over time. The composite matrix takes into account the above constraints on all tasks and resources. In the process of combining the individual resource matrices, resource allocations can be shifted in time when necessary to accommodate the overall constraints visible from the composite matrix. If multiple tasks are demanding the same resource in the composite matrix, then the highest constrained resource is allocated to the highest priority task. For each time slot, when the highest constrained resource is fully utilized, then lower constrained resources are filled-in to perform lower priority tasks while there is time and resources to do so. The objective is to maximize the utilization of each resource in the descending order from the highest priority task.

The composite resource is then passed to the scheduler to complete the optimization. The scheduler assigns start and end times to each task, e.g., as shown in FIG. 6, again taking into account the resources constraints from the composite matrix as well as the interdependencies between the tasks. The schedule will adjust the respective start times accordingly to optimize the project and achieve its completion in the least amount of time. Hence, the activities within the project are scheduled to minimize overall duration of project, while observing all constraints and limited capacities and resources.

Figure 15:
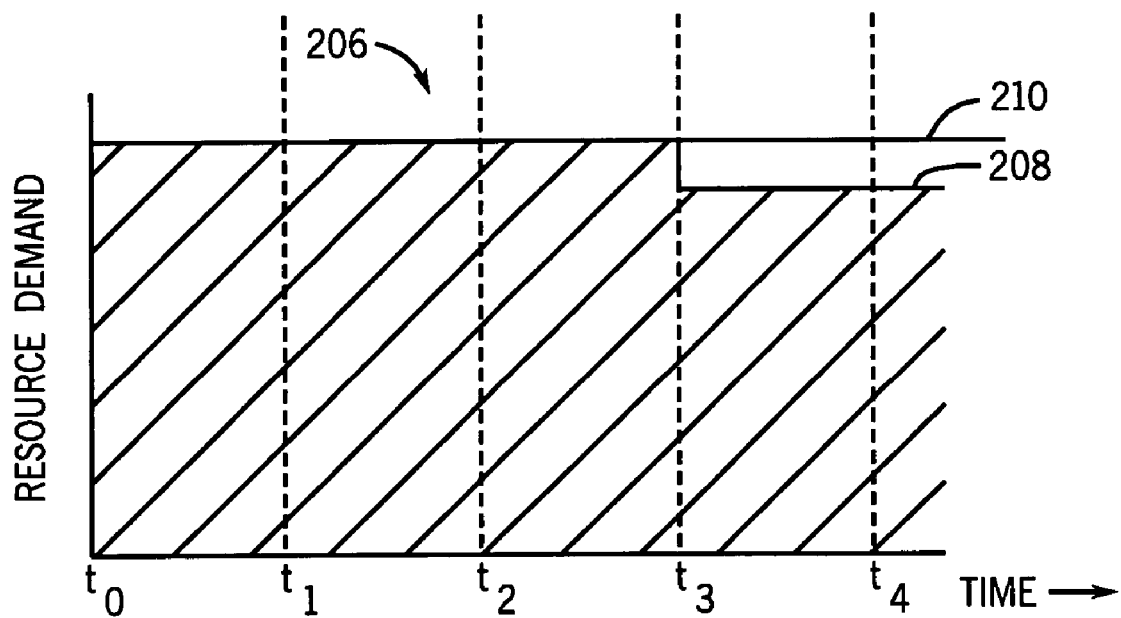
FIG. 15 is a histogram with optimized resource allocation.

In FIG. 15, webpage 206 illustrates histogram 208 from a second utilization scenario of the resource discussed in FIG. 14. Line 210 represents the available resource. The available resource shown in line 210 has been increased over the level of the resource in line 204. As seen by histogram 208, between times $t_0$ and $t_1$, the demand now meets the available resource. Likewise, between times $t_1$ and $t_2$, and between times $t_2$ and $t_3$, the resource demand is equal to the available resource. Between times $t_3$ and $t_4$, the resource demand is slightly less than the available resource. The histogram 208 in FIG. 15 is closer to optimization. The resource in histogram 208 is better utilized. The user has been able to optimize the resource allocation by running a variety of what-if scenarios that change the allocation of one or more resources. When the demand profile matches the resource allocation over time, then the project is considered optimized.

The time lines of FIG. 6 will change with the optimized resource allocation. The project management team will be able to see which resource allocation scenario provides the best result for timely and cost effective completion of the project. Project management system 10 gives the organization capacity to achieve project goals.

Figure 16:
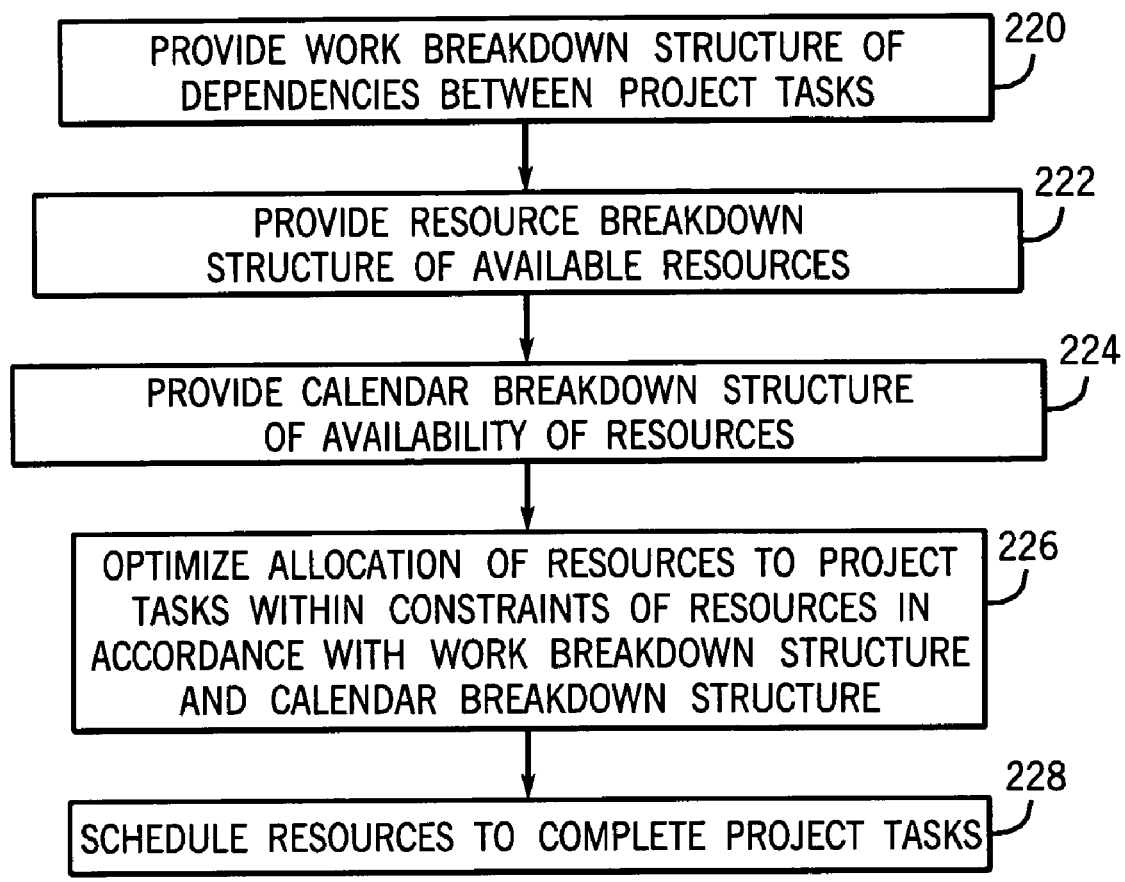
FIG. 16 is a flowchart of the method of project management.

FIG. 16 illustrates a method of project management. Step 220 provides a work breakdown structure of dependencies between project tasks. The work breakdown structure is organized as a set of hierarchical related project tasks. Step 222 provides a resource breakdown structure of available resources. The resource breakdown structure includes personnel and inanimate objects. Step 224 provides a calendar breakdown structure of availability of the resources. The calendar breakdown structure is defined on departmental basis. Step 226 optimizes allocation of the resources to the project tasks within constraints of the resources in accordance with the work breakdown structure and calendar breakdown structure. Step 228 schedules the resources to complete the project tasks. A histogram of project demand versus available resources is generated. The histogram of project demand versus available resources is used to optimize resource allocation.

The project management system has powerful modeling functionality which uses information in the present and provides a framework for making estimates in the future. The modeling functionality permits industrial engineers, planners, and schedulers to deal with the full range of information that is needed to make decisions for anticipated future performance. The system gives managers a tool that instantly generates alternative courses of action visualized through powerful "what-if" scenarios and impact analysis functions.

Figure 17:
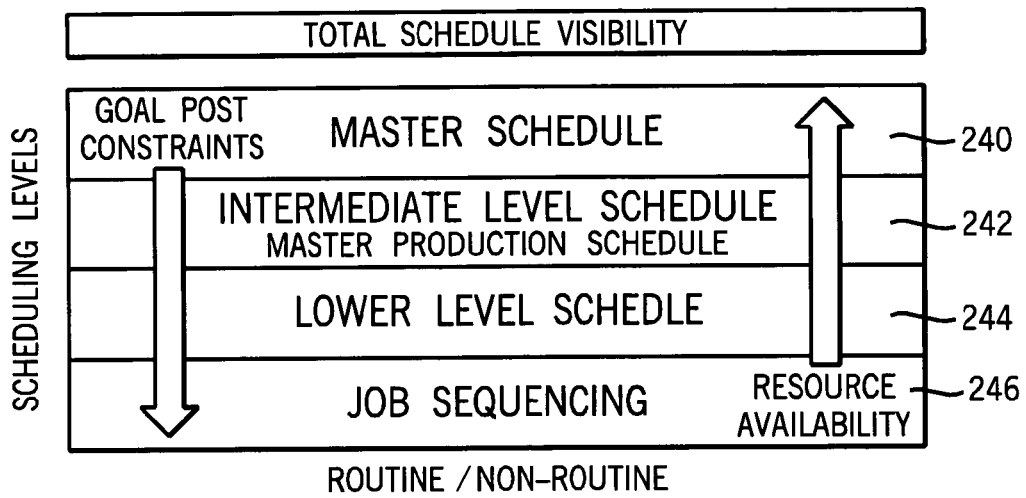
FIG. 17 illustrates total schedule visibility.

FIG. 17 illustrates a total schedule visibility. The scheduling levels include master schedule 240, intermediate level schedule 242, lower level schedule 244, and job sequencing 246. Goal post constraints decrease moving down between scheduling levels; resource availability increases moving up between scheduling levels.

The project management system provides job zoning and sequencing to support production process standardization, process organization and mapping which, when used in conjunction with the advanced constraint scheduling engine, provides the highest level of optimization possible of the work flow. With its built-in smart template capability, the planning and scheduling engine has the capacity to become more accurate in its delivery of optimized schedules. It can simulate different scenarios and if it finds a dead-end, it can backtrack and begin the analysis process over, until it finds the best schedule scenario. The system provides "Labor Resource Management" which supports the optimization of the work schedule to the workload, including finite capacity planning and overtime control. When properly implemented, such capabilities yield increases facility throughput and provides a higher level of job control management.

Within the aerospace industry, the system further provides support for applications such as hangar floor activities. The functions available to track and manage detailed execution plans used by hangar personnel include the generation of electronic bar charts. Another area that can be exploited is the ability to monitor and control actual production activities. The system lets you sequence a work package into its most logical and efficient work flow, which is done by applying rules of production such as aircraft zones, skills, ATA/SubATA, production process functions such as Open, Close, Inspect, etc. The system ensures efficient use of manpower, aids in the improvement of facility management, increases the scheduler's visibility of the maintenance operation, aids in the management of large non-routine work raised during the maintenance operation-work that jeopardizes delivery dates-tracks performance accurately, and is a tool for reducing maintenance operation span time. The combination of maintenance operation volume management and resource management improves the overall management of the facility.

The invention integrates service and maintenance management as part of its design. It quickly initiates schedules, and tracks maintenance activities and service requests by consolidating all service management functions within a set of data-entry screens. Maintenance performance can be documented (and measured) with consistent metrics across the organization.

Figure 18:
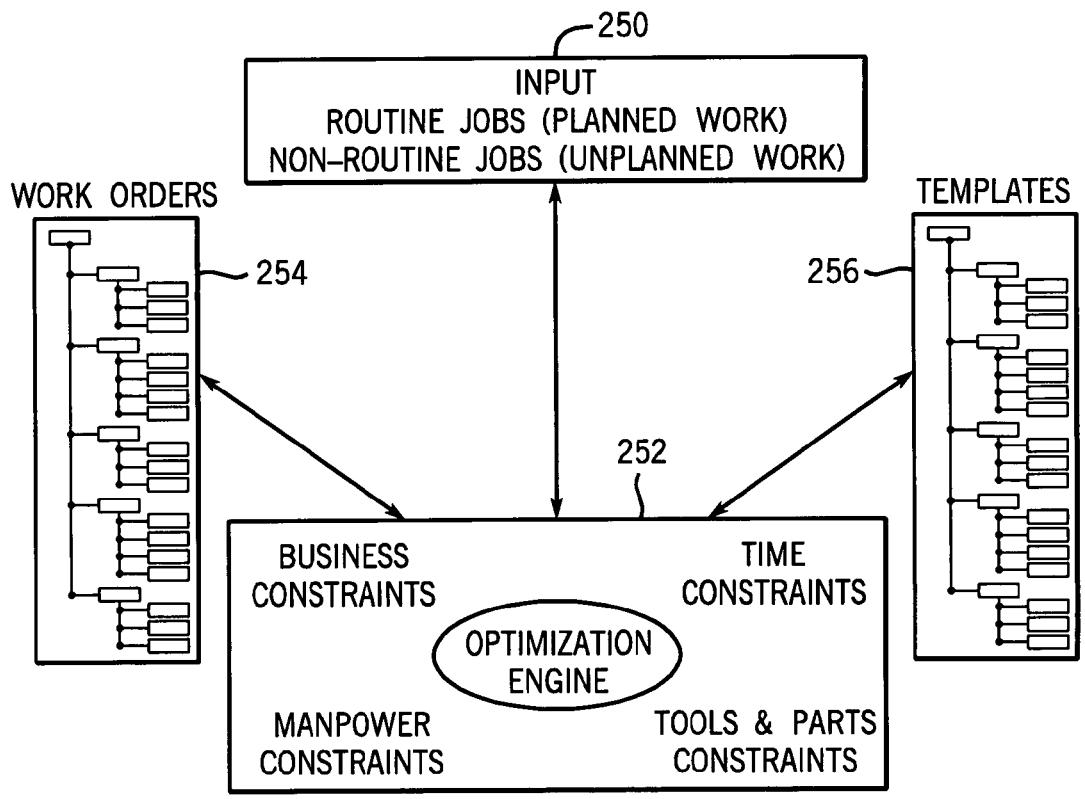
FIG. 18 illustrates the interrelationship between job input, optimization engine, work orders, and templates.

FIG. 18 illustrates the interaction between job input 250, optimization engine 252, work orders 254, and templates 256. The job input 250 can be routine (planned) or non-routine (unplanned) work. The optimization engine 252 takes into account business constraints, manpower constraints, time constraints, and tool and parts constraints during the optimization process.

Successful implementation of project control and resource management initiatives require a visible and continuous commitment from upper-level executives. The invention provides the framework for defining and directing management commitment. The invention can become a critical component of productivity initiative. It is difficult, if not impossible, to improve productivity if you cannot measure it. It is difficult to optimize the use of limited resources if the impact of changing priorities is unclear. It is impossible to take corrective action if problems are not highlighted until after the opportunities for corrective action have passed.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer implemented method of project management, comprising:
retrieving project tasks from a database using a distributed computer network, each project task having a cost center, account number, job identification (ID), description, type, work duration, start time, and priority, each project task describing an activity to be performed by available resources, the available resources including personnel, equipment, parts and tools;
displaying the project tasks using a user interface, the user interface allowing a user to create a work breakdown structure of dependencies between the project tasks by defining dependency chains between related project tasks and wherein the work breakdown structure is organized as a set of hierarchical related project tasks using the user interface;
providing a resource breakdown structure of the available resources, the resource breakdown structure being stored in the database and describing the personnel, equipment, parts and tools, each personnel entry in the resource breakdown structure describing a cost center, account number, resource type, ID, description and skill number;
providing a calendar breakdown structure of availability of the resources;
optimizing allocation of the resources to the project tasks within constraints of the resources in accordance with the work breakdown structure and calendar breakdown structure using an earned value of each of the personnel, equipment, parts and tools of the resource breakdown structure to correlate an efficiency of each of the available resources, the earned value of the personnel being dependent upon the skill number of the personnel;
scheduling the resources to complete the project tasks by:
sorting the project tasks by priority in accordance with any defined dependency chains, and
allocating resources to each of the project tasks in accordance with the earned value of each of the personnel, equipment, parts and tools of the resource breakdown structure; and
displaying a resource schedule using the user interface for assignment of tasks to one or more resources by the user.

2. The computer implemented method of claim 1, wherein the step of optimizing allocation of available resources involves creation of a matrix for each resource defining tasks to be completed by the respective resource over time.

3. The computer implemented method of claim 2, further including combining the matrices of each resource into a composite resource matrix.

4. The computer implemented method of claim 3, further including scheduling the project tasks based on the composite resource matrix.

5. A method of managing project execution, comprising:
retrieving task objects from a database stored on a computer, each task object being configurable to describe an activity to be performed by available resources, the available resources including personnel, equipment, parts and tools;
displaying the task objects using a user interface, the user interface allowing a user to create a set of hierarchical related task objects by defining dependency chains between related task objects;
generating a plurality of calendars for project resources;
identifying a set of resources for performing the task objects, the set of resources being retrieved from the database and describing personnel, equipment, parts and tools, each personnel entry in the resource breakdown structure identifying a skill number;
allocating the set of resources to perform the task objects using an earned value of each of the personnel, equipment, parts and tools of the set of resources to correlate an efficiency of each of the resources, the earned value of the personnel being dependent upon the skill number of the personnel;
optimizing the resource allocation to the task objects; and
displaying an optimized resource allocation using the user interface for assignment of task objects to available resources.

6. The method of claim 5, wherein the step of optimizing the resource allocation involves creation of a matrix for each resource defining tasks to be completed by the respective resource over time.

7. The method of claim 6, further including combining the matrices of each resource into a composite resource matrix.

8. The method of claim 7, further including scheduling the project tasks based on the composite resource matrix.

9. The method of claim 5, further including loading the task objects from a template.

10. A computer system, comprising:
means for retrieving project tasks from a database stored on a computer, each project task describing an activity to be performed by available resources;
means for displaying the project tasks, the means for displaying allowing a user to create a work breakdown structure of dependencies between project tasks;
means for providing a resource breakdown structure of available resources;
means for providing a calendar breakdown structure of availability of the resources;
means for optimizing allocation of the resources to the project tasks within constraints of the resources in accordance with the work breakdown structure and calendar breakdown structure using an earned value of each of the available resources of the resource breakdown structure to correlate an efficiency of each of the available resources;
means for scheduling the resources to complete the project tasks; and
means for displaying a resource schedule for assignment of tasks to one or more resources by the user.

11. The computer system of claim 10, wherein the means for optimizing allocation of available resources is configured to create a matrix for each resource defining tasks to be completed by the respective resource over time.

12. The computer system of claim 11, further including means for combining the matrices of each resource into a composite resource matrix.

13. The computer system of claim 12, wherein the project tasks are scheduled based on the composite resource matrix.

14. The computer system of claim 10, wherein the work breakdown structure is organized as a set of hierarchical related project tasks.

15. The computer system of claim 10, wherein the resource breakdown structure includes personnel, tools and parts.

16. A computer program product, comprising computer executable instructions, which, when executed by a processor of a computer, cause the computer to:
retrieve project tasks from a database stored on a computer, each project task describing an activity to be performed by available resources;
display the project tasks using a user interface, the user interface allowing a user to create a work breakdown structure of dependencies between project tasks;
provide a resource breakdown structure of available resources;
provide a calendar breakdown structure of availability of the resources;
optimize allocation of the resources to the project tasks within constraints of the resources in accordance with the work breakdown structure and calendar breakdown structure using an earned value of each of the available resources of the resource breakdown structure to correlate an efficiency of each of the available resources;
schedule the resources to complete the project tasks; and
display a resource schedule using the user interface for assignment of tasks to one or more resources by the user.

17. The computer program product of claim 16, wherein the optimizing allocation of available resources involves creation of a matrix for each resource defining tasks to be completed by the respective resource over time.

18. The computer program product of claim 17, further including executable instructions or software, which, when executed by a processor of a computer, cause the computer to combines the matrices of each resource into a composite resource matrix.

19. The computer program product of claim 18, wherein the project tasks are scheduled based on the composite resource matrix.

* * * * *